(12) United States Patent
Nagamiya et al.

(10) Patent No.: US 6,562,501 B1
(45) Date of Patent: May 13, 2003

(54) CONTROL SYSTEM FOR FUEL CELL

(75) Inventors: Kiyomi Nagamiya, Toyota (JP);
Masashi Yamashita, Aichi-ken (JP);
Iwao Maeda, Nagoya (JP); Masaaki Yamaoka, Toyota (JP); Seiji Mizuno, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 86 days.

(21) Appl. No.: 09/723,225

(22) Filed: Nov. 28, 2000

(30) Foreign Application Priority Data

Nov. 30, 1999 (JP) .............................. 11-340626

(51) Int. Cl.$^7$ ................................ H01M 8/04
(52) U.S. Cl. ........................ 429/25; 429/22; 429/23; 429/24
(58) Field of Search .................. 429/22, 23, 24, 429/25, 13

(56) References Cited

U.S. PATENT DOCUMENTS 6,013,385 A * 1/2000 DuBose ................. 429/17

FOREIGN PATENT DOCUMENTS

| JP | 7-22047 | | 1/1995 |
| JP | 8-50905 | * | 2/1996 |
| JP | 9-180743 | | 7/1997 |
| JP | 10-172593 | | 6/1998 |
| JP | 10-255828 | | 9/1998 |

* cited by examiner

Primary Examiner—Patrick Ryan
Assistant Examiner—Jonathan Crepeau
(74) Attorney, Agent, or Firm—Oblon, Spivak, McClelland, Maier & Neustadt, P.C.

(57) ABSTRACT

A control system for a fuel cell to output an electric energy by a reaction between a fuel gas and an oxidizing gas. The control system comprises a humidifier for decreasing the humidification of the fuel cell when the pressure in the fuel cell is high, and for increasing the humidification of the fuel cell when the pressure in the fuel cell is low.

4 Claims, 3 Drawing Sheets

CONTROL SYSTEM FOR FUEL CELL

BACKGROUND OF THE INVENTION

1. Field of the Invention

The present invention relates to a control system for a fuel cell to generate an electric power by an electrochemical reaction between a fuel gas and an oxidizing gas and, more particularly, to a control system for controlling a humidification of the fuel cell.

2. Related Art

The fuel cell of a polymer electrolyte film type or a phosphoric acid type has to be supplied from the outside with water for keeping the electric conductivity or activity of the electrolyte. In order to lower the electric resistances of electrodes, on the other hand, the fuel cell has to be held in a wet state. For example, the former fuel cell using the polymer electrolyte film such as an ion exchange film is humidified by supplying it with a fuel gas (e.g., a hydrogen gas) and an oxidizing gas (e.g., air) containing water, so as to increase the electric conductivity of the electrolyte film and decrease the electric resistances of the individual electrodes.

The humidification is desired to be as much as possible for improving the electric conductivity or the electric resistances. If the water supply is so excessive that the electrolyte or the electrodes are wetted with water droplets, however, the gas reaction is obstructed to lower the output of the fuel cell. On the other hand, the hydrogen ions (or protons) having passed through the electrolyte film may combine with the electrons on the cathode side to cause the hydrogen gas to be mixed into the air. Therefore, the humidification is restricted from the viewpoint of preventing the flooding and the accompanying reduction in the output. Thus, it is the general practice to control the humidification of the fuel cell not only on the basis of a predetermined target value but also on the basis of the electric resistance or output detected.

In the invention disclosed in Japanese Patent Laid-Open No. 10-255828, on the contrary, the humidification is performed by controlling the injection rate of pure water into the supply gas on the basis of the flow rate and temperature of the supply gas, the temperature of the pure water, the load on the cell and the internal temperature of the cell.

In the aforementioned fuel cell of the solid polymer film type, for example, the water to be supplied to the electrolyte and the individual electrodes is the one supplied together with the gases, the one to penetrate due to the humidity difference and the one generated by the reaction. On the contrary, the water to be discharged is the one to be discharged together with the gases. The water on the supply side is controlled, in the invention disclosed in the Laid-Open, on the basis of the supply gas flow rates, the pure water temperature, the cell load and the cell internal temperature. This is the control of the water volume, as demanded for running the fuel cell. In addition to this control, on the other hand, the disclosed invention prevents the water from becoming relatively excessive to cause the dew condensation, by controlling the water supply on the basis of the supply gas temperature.

In the running state of the fuel cell, the supply and the discharge of water concurrently occur. In the disclosed invention, however, the water supply is controlled, but the water to be discharged together with the excess gas is not controlled. In other words, the internal situation of the fuel cell is not necessarily precisely reflected in the humidification control, and the water content may become excessive or short.

SUMMARY OF THE INVENTION

A main object of the invention is to control the water content in a fuel cell while reflecting the internal situations of the cell more precisely.

Another object of the invention is to provide a control system capable of generating a high power stably.

We have noted that the absolute water content in the fuel cell becomes the more at the higher internal pressure to make it hard to cause the water shortage by the excess gas carrying away the water, while the absolute water content becomes the less at the lower internal pressure to make it easy to cause the water shortage by the excess gas carrying away the water. Therefore, the invention is characterized by adopting the pressure in the fuel cell as the control parameter for the humidification.

According to the invention, there is provided a control system for a fuel cell to output an electric energy by a reaction between a fuel gas and an oxidizing gas, comprising: means for decreasing the humidification of the fuel cell when the pressure in said fuel cell is high, and for increasing the humidification of the fuel cell when the pressure in said fuel cell is low.

When the absolute water content in the fuel cell is high because of the high internal pressure and when its shortage is hardly caused by the gas carrying away the water, according to the control system of the invention, a new water supply to or humidification of the fuel cell is decreased to prevent the excessive water content. When the absolute water content in the fuel cell is low because of the low internal pressure and when its shortage is easily caused by the gas carrying away the water, on the contrary, a new water supply to or humidification of the fuel cell is increased to prevent the water shortage.

In the control system of the invention, on the other hand, the humidification for each drive situation is determined on the basis of a physical model of said fuel cell to be controlled, for which the water balance is predetermined.

In the control system thus constructed, it is possible to set the humidification reflecting the running situation of the fuel cell more precisely.

Moreover, the control system of the invention can further comprise: means for detecting the internal resistance of said fuel cell; and means for correcting the humidification determined by reflecting the running situation on the basis of the detected internal resistance.

In the control system thus constructed, the humidification can be performed without raising the internal resistance thereby to raise the output of the fuel cell.

In addition to the aforementioned individual constructions, moreover, the control system can further comprise: means for detecting the pressures in the entrances of said gases to be fed to said fuel cell; and means for correcting the humidifications determined by reflecting the running situation on the basis of the detected entrance pressures.

According to the control system thus constructed, when the entrance pressure of the gas of the fuel cell is high, the gas having the water content hardly enters the fuel cell. Since the humidification is corrected on the basis of the entrance pressure, however, it is possible to avoid the short humidification, even when the gas hardly enters the fuel cell, and the excessive humidification even when the gas easily enters.

The above and further objects and novel features of the invention will more fully appear from the following detailed description when the same is read with reference to the accompanying drawings. It is to be expressly understood, however, that the drawings are for the purpose of illustrations only and are not intended as a definition of the limits of the invention.

DETAILED DESCRIPTION OF THE PREFERRED EMBODIMENT

Figure 3:
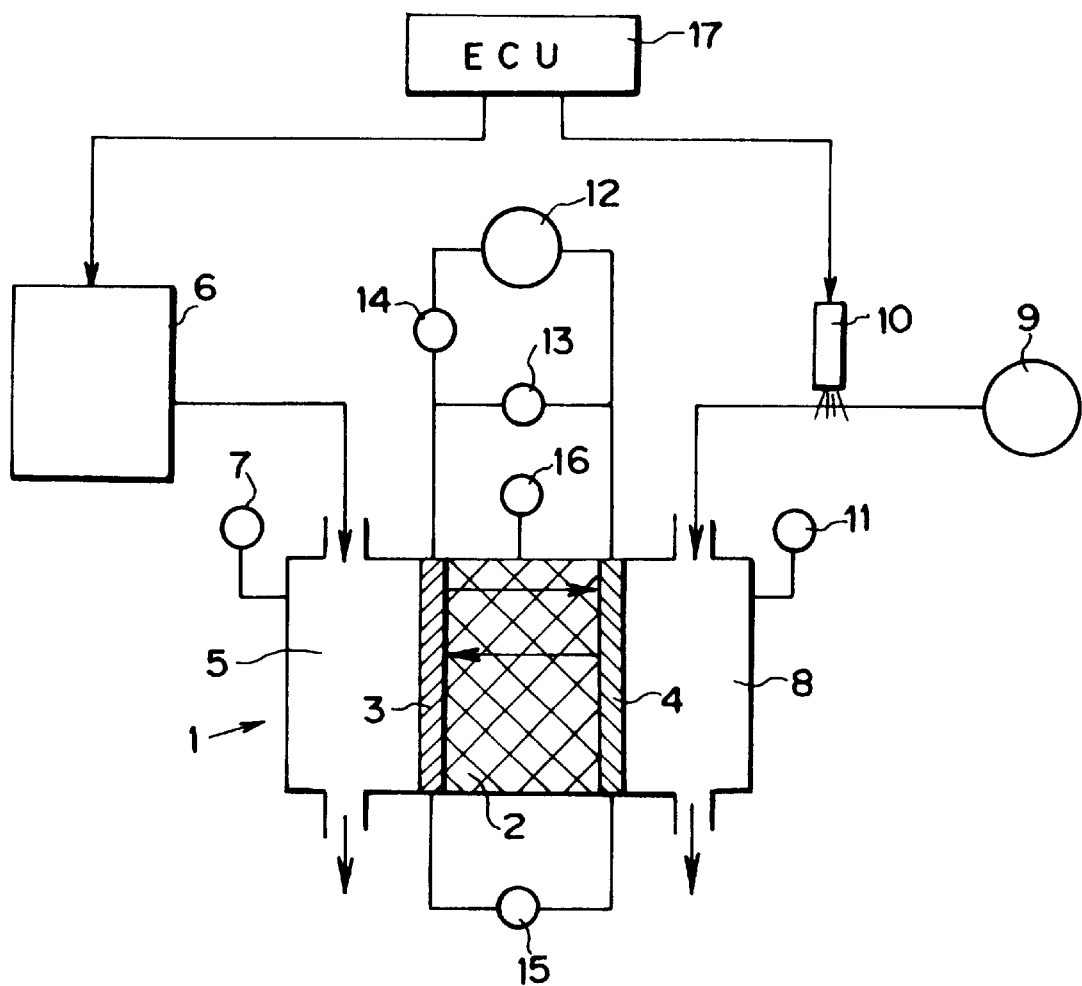
FIG. 3 is a block diagram schematically showing an entire construction of a fuel cell and its control system.

The invention will be described in connection with a specific embodiment with reference to the accompanying drawings. FIG. 3 schematically shows a single body (or single cell) of a fuel cell 1 according to the invention. Across a solid electrolyte 2, there are mounted an anode (or fuel electrode) 3 and a cathode (or air electrode) 4. In short, the solid electrolyte 2 is made of a substance having an ion permeability and is formed of a polymer film having a proton permeability, for example. On the other hand, the individual electrodes 3 and 4 are constructed by holding a collector on a porous layer composed of water-repellent particles and catalytic particles.

On the side of the anode 3, moreover, there is formed a fuel gas passage 5, with which there is connected a reformer 6 as one example of a fuel gas supply source. This reformer 6 is a unit for generating a hydrogen-enriched reformed gas by the reforming reaction of hydrocarbons such as methanol. In the embodiment shown in FIG. 3, therefore, the reformed gas is used as the fuel gas. On the other hand, the reformer 6 is constructed to supply more steam than that necessary for the reforming reaction thereby to set the reformed gas in a proper wet state.

There is provided a pressure sensor 7 for detecting the pressure in the fuel gas passage 5. This pressure sensor 7 is constructed to detect the pressure on the side of the anode 3 as an average between the pressure on the entrance side and the pressure on the exit side of the fuel gas passage 5.

On the side of the cathode 4, on the other hand, there is formed an oxidizing gas passage 8, with which there is connected an air pump 9 for supplying air as the oxidizing gas. Between the air pump 9 and the oxidizing gas passage 8, there is connected a humidifying actuator 10 for humidifying the air. There is further provided a pressure sensor 11 for detecting the pressure in the oxidizing gas passage 8. This pressure sensor 11 is constructed to detect the pressure on the side of the cathode 4 as an average between the pressure on the entrance side and the pressure on the exit side of the oxidizing gas passage 8.

With the aforementioned fuel cell 1, there is connected a suitable external load 12 such as a drive motor. In this circuit, there are provided a voltage sensor 13 and a current sensor 14. Further provided are a resistance sensor 15 for detecting the resistance of the fuel cell 1 and a temperature sensor 16 for detecting the temperature. Further provided is a control unit (ECU) 17 for controlling a humidification by performing calculations on the basis of data inputted from the aforementioned individual sensors 7, 11, 13, 14, 15 and 16 and another not-shown sensor.

In the fuel cell 1 thus far described, the following reactions occur to generate an electromotive force by using the hydrogen-enriched reformed gas as the fuel gas and the oxygen in the air as the oxidizing gas. On the side of the anode 3, the following reaction occurs to emit electrons:

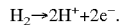

On the side of the cathode 4, the following reaction occurs to generate water:

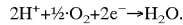

Figure 1:
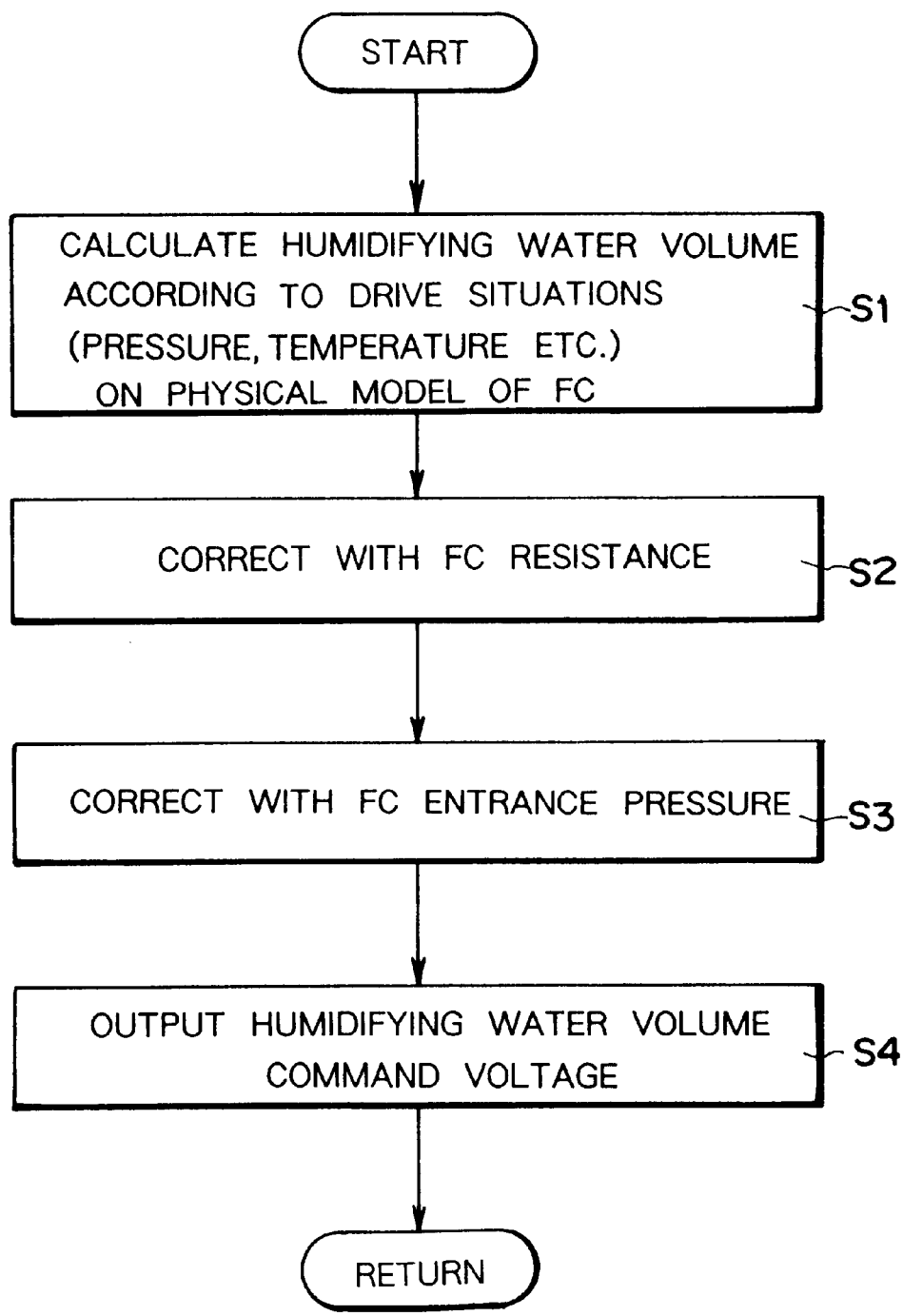
FIG. 1 is a flow cart for explaining an example of a control to be made by a control system according to the invention.

The individual electrodes 3 and 4 and the solid electrolyte 2 are kept in the wet state with the generated water and the water supplied together with the individual gases. On the other hand, the water content penetrates according to the electricity generation and is discharged to the outside by the excess gas. In the control unit 17 according to the invention, therefore, the humidification (or the water volume for the humidification) is determined, as shown in FIG. 1.

Specifically, the behaviors of the water in the fuel cell 1 can be analyzed in the following manners so that the humidifying water volume according to the individual drive situations is determined (at Step S1) on the basis of the physical model of the fuel cell 1. First of all, the humidifying water volume Wain (mols/sec) on the side of the anode 3 is calculated by adding the water volume Waout (mols/sec) to be discharged together with the excess gas and the water volume (or the drag water volume) Wdrag (mols/sec) to migrate from the side of the anode 3 to the side of the cathode 4 in accordance with the migration of protons (or charges), and by subtracting the water volume (or the back defusing water volume) Wbackdef (mols/sec) to penetrate from the side of the cathode 4 to the side of the anode 3 due to the moisture difference (or the water content difference), from that sum. That is:

$$Wain = (Waout + Wdrag) - Wbackdef \quad (1).$$

On the other hand, the humidifying water volume Wcin (mols/sec) is calculated by subtracting the water generation rate Wgen (mols/sec) by the reaction and the water volume Wdrag (mols/sec) to be supplied as the drag water in accordance with the migration of the protons (or charges) from the water volume Wcout (mols/sec) to be discharged together with the excess air, and by adding the water volume Wbackdef (mols/sec) to be lost as the back defusing water, to the difference. That is:

$$Wcin = (Wcout - Wgen - Wdrag) + Wbackdef \quad (2).$$

In Formulas (1) and (2), the water volumes Waout (mols/sec) and Wcout (mols/sec) to be discharged together with the excess gas, the water generation rate Wgen (mols/sec) by the reaction, and the offset (Wdrag−Wbackdef) (mols/sec) between the drag water volume Wdrag (mols/sec) and the back defusing water volume Wbackdef (mols/sec) are approximately expressed in Formulas (3) and (4) by using the Faraday's law:

$$Wain = Waout + (Wdrag - Wbackdef) = \{Pcs/(Pa - Pcs)\} \times \{A \times I \times sta/(2 \times F) - A \times I/(2 \times F)\} + (A \times I)/(2 \times F) \times 2 \times n \quad (3);$$

and $$Wcin = Wcout - (Wdrag - Wbackdef) - Wgen = \{Pcs/(Pc - Pcs)\} \times \{A \times I \times 5 \times stc/(4 \times F) - A \times I/(4 \times F)\} - (A \times I)/(2 \times F) \times 2 \times n - A \times I/(2 \times F) \quad (4).$$

Here in these Formulas (3) and (4): Pcs is the current saturated water vapor pressure (ata) at the temperature of the fuel cell 1; Pa is the pressure (ata) on the side of the anode 3; A is the area (cm²) of the electrodes; I is the current value (A/cm²); sta is the excess percentage (or the anode stoichiometry) of the hydrogen gas; F is the Faraday's constant (A·sec/mol); n is the number of water molecules to migrate for one proton of the total of the back defusing water and the drag water; Pc is the pressure (ata) on the side of the cathode 4; and stc is the excess percentage (or the cathode stoichiometry) of the oxygen gas.

By introducing the data, as obtained by the individual sensors 7, 11, 13, 14, 15 and 16 and including the current values, the temperature of the fuel cell 1, the individual pressures at the electrodes 3 and 4 and the excess percentages of the individual gases set at the driving time, into Formulas (3) and (4), therefore, it is possible to determine the theoretical values of the humidifying water volume Wain of the fuel gas and the humidifying water volume Wcin of the oxidizing gas. For these determinations, the individual pressures on the sides of the electrodes 3 and 4 are adopted as parameters for calculating the humidifying water volumes, and these humidifying water volumes are decreased for high pressures but increased for low pressures, so that the humidifications can be performed reflecting the internal situations of the fuel cell 1 more precisely.

As described hereinbefore, the water content in the fuel cell 1 exerts such serious influences upon the resistance that the resistance rises as the water content lowers. Since the resistance can be actually measured, moreover, the value, as determined on the basis of the aforementioned physical model, is corrected with resistance (at Step S2). Formulas for correcting the humidifying water volumes Wain and Wcin on the basis of a measured resistance Rfc are exemplified by (5) and (6):

$$Wain'=Wain+Kpa\times(RefRfc-Rfc)+Kia\times\Sigma(RefRfc-Rfc) \quad (5);$$

and $$Wcin'=Wcin+Kpc\times(RefRfc-Rfc)+Kic\times\Sigma(RefRfc-Rfc) \quad (6).$$

Here in these Formulas (5) and (6): RefRfc is the target resistance; Kpa, Kia, Kpc and Kic are the predetermined control parameters; and Σ (RefRfc–Rfc) is the sum of the deviations between the target resistances and the measured resistances.

By thus correcting the humidifying water volumes on the basis of the measured values of the physical quantities in the fuel cell 1, it is possible to perform the humidifications reflecting the internal situations of the fuel cell 1 more precisely.

Figure 2:
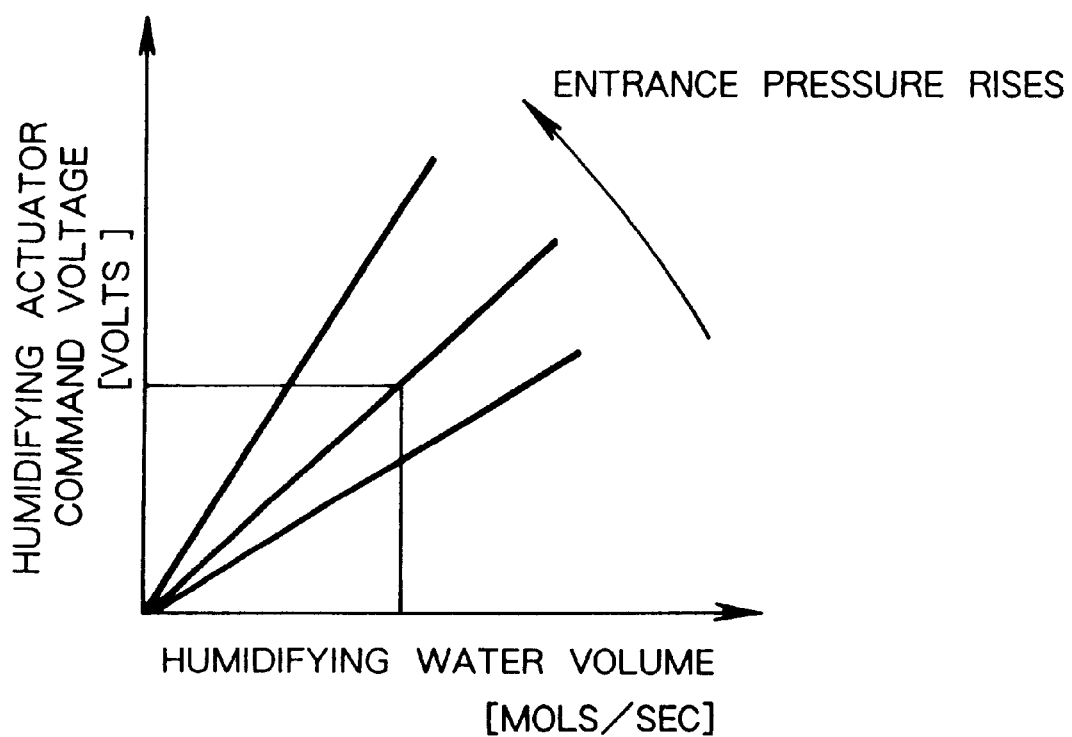
FIG. 2 is a characteristic diagram illustrating relations between a humidifying water volume in a humidifying actuator and a command voltage.

Here, the humidifying actuator 10 for supplying water to the air or the oxidizing gas is exemplified by a humidifier of the type having a discharge augmented according to the voltage so that the humidifying water volume is substantially proportional to the voltage, as illustrated by characteristic lines in FIG. 2.

When the humidifying water is discharged by the humidifying actuator 10, on the other hand, the relative discharge becomes the lower for the higher pressure in the oxidizing gas passage 8. In order to discharge the humidifying water by the target rate, therefore, the command voltage has to be raised according to the pressure in the oxidizing gas passage 8. This correction according to the pressure is specifically made on the basis of the entrance pressure of the oxidizing gas passage 8 (at Step S3). For the higher entrance pressure, more specifically, the humidifying actuator command voltage is set on the basis of the characteristic line having the larger proportional constant (or the larger gradient) in FIG. 2. By thus making the correction based on the internal pressure, it is possible to effect the humidification reflecting the internal situations of the fuel cell 1 more precisely.

Then, the command value thus determined is outputted (at Step S4). To the humidifying actuator 10, more specifically, there is outputted the command voltage which is corrected with the entrance pressure. In order to humidify the side of the anode 3, on the other hand, the ratio S/C (i.e., the ratio of the water vapor volume to the quantity of carbon) in the reformer 6 is changed to the humidifying water volume calculated.

Here will be described the relations between the foregoing specific embodiment and the invention. The functional means for executing the aforementioned control of Step S1 corresponds to humidification control means in the invention; the aforementioned resistance sensor 15 corresponds to internal resistance detecting means in the invention; the aforementioned functional means for executing the control of Step S2 corresponds to first humidification correcting means in the invention; the aforementioned pressure sensor 11 corresponds to entrance pressure detecting means in the invention; and the aforementioned functional means for executing the control of Step S3 corresponds to second humidification correcting means in the invention.

Here, the foregoing specific embodiment has been described by exemplifying the fuel cell using the polymer electrolyte film, but the invention should not be limited to the specific embodiment. In short, the invention can be applied to a control system for a fuel cell requiring the humidification. On the other hand, the fuel cell per se should not be limited to the fuel cell of the type employing the hydrogen-enriched modified gas or the air but can be exemplified by one using another suitable gas. Therefore, the physical model in the invention may be set to match a target fuel cell.

Here will be synthetically described the advantages which are obtained by the invention. According to the invention, the humidifying water volume is so set on the basis of the internal pressure of the fuel cell that it is decreased when the pressure is so high as to have less water content carried away by the excess gas but increased when the pressure is so low as to have more water content carried away by the excess gas. As a result, the humidification can be performed reflecting the drive situations of the fuel cell more precisely so that a high power generation can be stably performed.

According to the invention, on the other hand, the humidifying water volume is corrected on the basis of the internal resistance varying in direct relation to the water content in the fuel cell. As a result, the water content in the fuel cell can be prevented from becoming short or excessive so that the precision of the control of the water content in the electrolyte or the electrodes can be improved to perform the high power generation stably.

According to the invention, still moreover, the humidifying water volume is corrected on the basis of the entrance pressure of the fuel cell so that the humidification can be performed reflecting the actual situations of the fuel cell precisely. In this respect, too, the high power generation can be stably performed preventing the humidification from becoming short or excessive.

What is claimed is:

1. A control system for a fuel cell to output an electric energy by a reaction between a fuel gas and an oxidizing gas, comprising:

humidification control means for determining the humidification for each drive situation on the basis of a physical model of said fuel cell to be controlled, for which a water balance is predetermined, to decrease the humidification of the fuel cell when the pressure in said fuel cell increases, and to increase the humidification of the fuel cell when the pressure in said fuel cell decreases;

internal resistance detecting means for detecting an internal resistance of said fuel cell; and first humidification correcting means for correcting the humidification, as determined for said each drive situation, on the basis of the internal resistance detected by said internal resistance detecting means.

2. A control system for fuel cell to output an electric energy by a reaction between a fuel gas, and an oxidizing gas, comprising:

humidification control means for determining the humidification for each drive situation on the basis of a physical model of said fuel cell to be controlled, for which a water balance is predetermined, to decrease the humidification of the fuel cell when the pressure in said fuel cell increases, and to increase the humidification of the fuel cell when the pressure in said fuel cell decreases;

entrance pressure detecting means for detecting pressures in entrances of said gases to be fed to said fuel cell; and second humidification correcting means for correcting the humidifications, as determined for said each drive situation, on the basis of the entrance pressures detected by said entrance pressure detecting means.

3. A control system for a fuel cell to output an electric energy by a reaction between a fuel gas and an oxidizing gas, comprising:

humidification control means for determining the humidification for each drive situation on the basis of a physical model of said fuel cell to be controlled, for which a water balance is predetermined, to decrease the humidification of the fuel cell when the pressure in said fuel cell increases, and to increase the humidification of the fuel cell when the pressure in said fuel cell decreases;

wherein said physical model sets:

the humidification of an anode of said fuel cell to the quantity which is calculated by adding the volume of water to migrate to the side of a cathode as charges migrate, to the volume of water to be discharged together with an excess gas, and further by subtracting the volume of water to penetrate to the side of the anode on the basis of the temperature difference between the anode and the cathode; and the humidification of the cathode of said fuel cell to the quantity which is calculated by subtracting the volume of water generated by a power generating reaction and the volume of water to migrate to the side of the cathode as said charges migrate, from the volume of water to be discharged together with the excess gas, and further by adding the volume of water to penetrate to the side of the anode on the basis of said temperature difference.

4. A control system for a fuel cell to output an electric energy by a reaction between a fuel gas and an oxidizing gas, comprising:

humidification control means for determining the humidification for each drive situation on the basis of a physical model of said fuel cell to be controlled, for which a water balance is predetermined, to decrease the humidification of the fuel cell when the pressure in said fuel cell increases, and to increase the humidification of the fuel cell when the pressure in said fuel cell decreases;

wherein said physical model calculates:

the humidification of an anode of said fuel cell on the basis of a saturated water vapor pressure in said fuel cell, the pressure on the side of the anode, an area of electrodes, a current value, the excess percentage of the fuel gas, the Faraday's constant and the number of water molecules to migrate together with one charge; and the humidification of a cathode of said fuel cell on the basis of the saturated water vapor pressure in said fuel cell, the pressure on the side of the cathode, the area of the electrodes, the current value, the excess percentage of the oxidizing gas, the Faraday's constant and the number of water molecules to migrate together with one charge.

* * * * *